(12) United States Patent
Suh et al.

(10) Patent No.: US 9,898,650 B2
(45) Date of Patent: Feb. 20, 2018

(54) SYSTEM AND METHOD FOR TRACKING POSITION BASED ON MULTI SENSORS

(71) Applicant: Electronics and Telecommunications Research Institute, Daejeon (KR)

(72) Inventors: Young Ho Suh, Daejeon (KR); Kang Woo Lee, Daejeon (KR); Sang Keun Rhee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 7 days.

(21) Appl. No.: 15/266,504

(22) Filed: Sep. 15, 2016

(65) Prior Publication Data

US 2017/0116752 A1 Apr. 27, 2017

(30) Foreign Application Priority Data

Oct. 27, 2015 (KR) ........................ 10-2015-0149759

(51) Int. Cl.
*G06K 9/00* (2006.01)
*G06K 9/34* (2006.01)
*H04N 7/18* (2006.01)
*G08B 13/196* (2006.01)
*G06T 7/292* (2017.01)

(52) U.S. Cl.
CPC ..... *G06K 9/00335* (2013.01); *G06K 9/00771* (2013.01); *G06K 9/00979* (2013.01); *G06K 9/00993* (2013.01); *G06K 9/34* (2013.01); *G06T 7/292* (2017.01); *G08B 13/19645* (2013.01);
(Continued)

(58) Field of Classification Search
CPC ........... G06K 9/00771; G06K 9/00778; G06K 9/00342; G06K 9/00335; G06K 9/34; G06K 9/00979; G06K 9/00993; G06K 9/00369; H04N 7/181; H04N 5/232; H04N 5/144; H04N 21/2187; H04N 21/26258; G06T 2207/10016; G06T 2207/30232; G06T 2207/10028; G06T 2207/20021; G06T 7/11; G06T 7/2093; G06T 7/292;
(Continued)

(56) References Cited

U.S. PATENT DOCUMENTS 6,873,712 B2 * 3/2005 Shibuya .............. G06K 9/6204
348/169
7,574,131 B2 * 8/2009 Chang .................. G03B 37/00
348/159
(Continued)

FOREIGN PATENT DOCUMENTS

KR 1020050077863 A 8/2005
KR 1020120104711 A 9/2012

*Primary Examiner* — Michael Osinski
(74) *Attorney, Agent, or Firm* — William Park & Associates Ltd.

(57) ABSTRACT

Provided are a system and a method for tracking a position based on multi sensors. The system according to the present invention includes: a space management server which divides a predetermined space into a predetermined number of spaces to generate a plurality of zones and manages information of each zone; and a zone management server which manages the information of the zone generated by the space management server and provides the space management server with zone session information of an object positioned in each zone and positional information of the corresponding object sensed by a position tracking sensor every time slot.

15 Claims, 10 Drawing Sheets

(52) U.S. Cl.
CPC ......... *H04N 7/181* (2013.01); *G06K 2209/40* (2013.01); *G06T 2207/10028* (2013.01)

(58) Field of Classification Search
CPC .... G06T 7/73; G03B 15/16; G08B 13/19641; G08B 13/19608; G08B 13/19645
USPC ........................................................ 382/103
See application file for complete search history.

(56) References Cited

U.S. PATENT DOCUMENTS

| | | | | |
|---|---|---|---|---|
| 8,509,496 B2* | 8/2013 | Steinberg | ........... | G06K 9/00228 382/103 |
| 8,854,469 B2* | 10/2014 | Horbinger | ............. | G06T 7/2053 348/159 |
| 8,965,043 B2* | 2/2015 | Porter | ................ | H04N 13/0011 345/419 |
| 9,202,112 B1* | 12/2015 | Ueta | ...................... | H04N 5/275 |
| 9,398,214 B2* | 7/2016 | Ahiska | ................... | H04N 5/217 |
| 9,794,508 B2* | 10/2017 | Gouda | .................... | G09G 5/00 |
| 9,799,123 B2* | 10/2017 | Sugaya | ..................... | G06T 7/60 |
| 2003/0048926 A1* | 3/2003 | Watanabe | .......... | G06K 9/00362 382/103 |
| 2004/0175021 A1* | 9/2004 | Porter | ................ | G06K 9/00228 382/118 |
| 2007/0230943 A1* | 10/2007 | Chang | .................... | G03B 37/00 396/322 |
| 2009/0262195 A1* | 10/2009 | Yoshida | ................. | H04N 5/232 348/159 |
| 2011/0285858 A1* | 11/2011 | Chen | ......................... | G06T 7/80 348/187 |
| 2014/0327780 A1* | 11/2014 | Herrli Anderegg | ......... | G08B 13/19645 348/159 |
| 2014/0348380 A1 | 11/2014 | Yoon et al. | | |
| 2015/0116502 A1 | 4/2015 | Um et al. | | |
| 2015/0339519 A1* | 11/2015 | Ueta | ..................... | H04N 5/275 382/103 |
| 2016/0104174 A1* | 4/2016 | Matsumoto | ........ | G06Q 30/0201 705/7.29 |
| 2016/0323532 A1* | 11/2016 | Gouda | ...................... | G09G 5/00 |
| 2016/0353064 A1* | 12/2016 | Aiura | ................. | G06K 9/00771 |
| 2017/0076175 A1* | 3/2017 | Sugaya | ..................... | G06T 7/60 |
| 2017/0105034 A1* | 4/2017 | Fujimori | .......... | H04N 21/26258 |
| 2017/0220970 A1* | 8/2017 | Kazama | ........... | G06Q 10/06314 |
| 2017/0272637 A1* | 9/2017 | Kawazoe | .............. | H04N 5/2352 |

* cited by examiner

SYSTEM AND METHOD FOR TRACKING POSITION BASED ON MULTI SENSORS

CROSS-REFERENCE TO RELATED APPLICATIONS

This application claims priority to and the benefit of Korean Patent Application No. 10-2015-0149759 filed in the Korean Intellectual Property Office on Oct. 27, 2015, the entire contents of which are incorporated herein by reference.

TECHNICAL FIELD

The present invention relates to a system and a method for tracking a position based on multi sensors.

BACKGROUND ART

In a position tracking system, one depth sensor has a measurement region by a measurement range from a minimum distance up to a maximum distance, a horizontal field of view, and a vertical field of view.

Accordingly, a plurality of depth sensors need to be installed in the position tracking system in order to simultaneously track positions for a plurality of persons who are positioned in a specific space.

However, when the position of the person is measured through the plurality of depth sensors, the measurement regions among the respective depth sensors overlap with each other, and as a result, interference occurs among signals of the respective depth sensors, and further, it is difficult to obtain accurate data because a criterion for distinguishing whether the persons simultaneously detected by the plurality of sensors are the same person or different persons is vague.

SUMMARY OF THE INVENTION

The present invention has been made in an effort to provide a system and a method for tracking a position based on multi sensors which are capable of rapidly and accurately tracking positions for a plurality of respective persons positioned in a predetermined physical space by using a plurality of depth sensors.

The technical objects of the present invention are not limited to the aforementioned technical objects, and other technical objects, which are not mentioned above, will be apparently appreciated to a person having ordinary skill in the art from the following description.

An exemplary embodiment of the present invention provides a system for tracking a position based on multi sensors, including: a space management server which divides a predetermined space into a predetermined number of spaces to generate a plurality of zones and manage information of each zone; and a zone management server which manages the information of the zone generated by the space management server and provides the space management server with zone session information of an object positioned in the zone and positional information of the corresponding object sensed by a position tracking sensor every time slot.

Herein, the space management server may add the corresponding object to an object list based on the zone session information of the object provided from the zone management server and connect a space session to a zone session of objects included in the object list to track the position of the corresponding object through the space session.

The zone management server may generate a zone session manager managing the zone, and the zone session manager may allocate the zone session to an object, which enters the zone, and cancel the zone session allocated to an object which leaves the zone.

The space management server may detect the position of the space session every time slot and connect the space session detected in a category allocated based on the position of the object verified in the corresponding space at a previous time slot.

The space management server may connect the space session positioned at a closest distance when the number of space sessions detected in the category allocated based the position of the object verified in the corresponding space at the previous time slot is two or more.

When the space session detected in the category allocated based on the position of the object verified in the corresponding space at the previous time slot is detected in a zone different from the zone where the corresponding object is positioned, the space management server may determine that the space session is duplicatively detected.

When there is no space session detected in the category allocated based on the position of the object verified in the corresponding space at the previous time slot, the space management server may cancel the space session by determining that the corresponding object leaves the space.

When the space session is detected in a category other than the category allocated based on the position of the object verified in the corresponding space at the previous time slot, the space management server may connect the corresponding space session to the zone session newly added to the object list.

The space management server may divide the predetermined space into zones of the number corresponding to the number of position tracking sensors positioned in the corresponding space.

The plurality of zones may be regions which are constituted by a field of view (FoV) and an operating region (range) of each position tracking sensor and do not overlap with each other.

Another exemplary embodiment of the present invention provides a method for tracking a position based on multi sensors, including: dividing, by a space management server, a predetermined space into a predetermined number of spaces according to the number of position tracking sensors installed in the corresponding space to generate a plurality of zones; generating, by a zone management server, zone session managers corresponding to the zone generated by the space management server and providing the space management server with zone session information of an object positioned in the zone allocated by the zone session manager and positional information sensed by the position tracking sensor; updating, by the space management server, the object list based on the zone session information of the object provided from the zone session manager; and tracking the position of the corresponding object through the space session by connecting the space session to the zone session of the objects included in the object list.

According to exemplary embodiments of the present invention, positions for a plurality of objects positioned in a predetermined physical space can be rapidly and accurately tracked by using a plurality of depth sensors.

The exemplary embodiments of the present invention are illustrative only, and various modifications, changes, substitutions, and additions may be made without departing from the technical spirit and scope of the appended claims by

Figure 1:
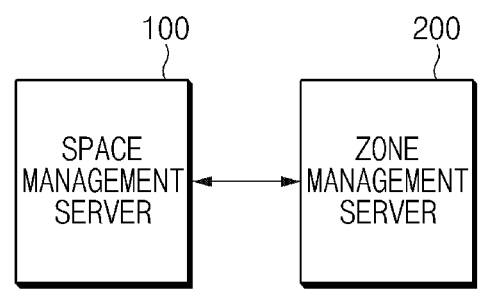
FIG. 1 is a diagram illustrating a configuration of a system for tracking a position according to the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, some exemplary embodiments of the present invention will be described in detail with reference to the exemplary drawings. When reference numerals refer to components of each drawing, it is noted that although the same components are illustrated in different drawings, the same components are designated by the same reference numerals as possible. In describing the exemplary embodiments of the present invention, when it is determined that the detailed description of the known components and functions related to the present invention may obscure understanding of the exemplary embodiments of the present invention, the detailed description thereof will be omitted.

Terms such as first, second, A, B, (a), (b), and the like may be used in describing the components of the exemplary embodiments of the present invention. The terms are only used to distinguish a component from another component, but nature or an order of the component is not limited by the terms. Further, if it is not contrarily defined, all terms used herein including technological or scientific terms have the same meanings as those generally understood by a person with ordinary skill in the art. Terms which are defined in a generally used dictionary should be interpreted to have the same meaning as the meaning in the context of the related art, and are not interpreted as an ideal meaning or excessively formal meanings unless clearly defined in the present application.

FIG. 1 is a diagram illustrating a configuration of a system for tracking a position according to the present invention.

Referring to FIG. 1, the system for tracking a position according to the present invention includes a space management server 100 and a zone management server 200.

Figure 2:
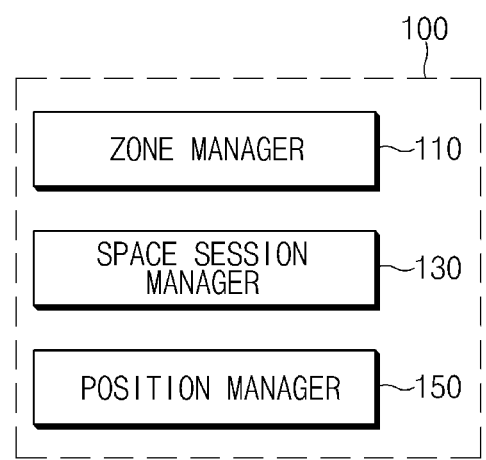
FIG. 2 is a diagram illustrating a detailed configuration for a space management server of FIG. 1.
Figure 3:
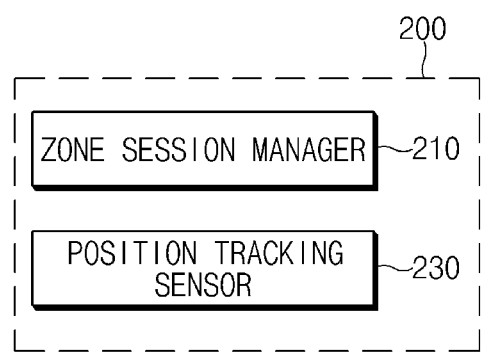
FIG. 3 is a diagram illustrating a detailed configuration for a zone management server of FIG. 1.

Herein, a detailed configuration of the space management server 100 is illustrated in FIG. 2 and a detailed configuration of the zone management server 200 is illustrated in FIG. 3.

Referring to FIGS. 2 and 3, the space management server 100 serves to generate a plurality of zones by dividing a predetermined space into a predetermined number of spaces and manage information of each zone. Herein, the zone, which is a region constituted by a field of view (FoV) and an operating region (range) of a position tracking sensor 230, corresponds to a partial region of a space. In this case, each zone is a region in which the respective zones do not overlap with each other in the space, and may have a unique zone coordinate system.

The zone management server 200 serves to manage information of the zone generated by the space management server 100 and track session information of an object which enters or leaves the corresponding zone and a position of the corresponding object.

The zone management server 200 may include a zone session manager 210 and a position tracking sensor 230 as illustrated in FIG. 3.

When two or more zones are generated by the space management server 100, the zone management server 200 receives and manages the information of the zone from the space management server 100. In this case, the zone management server 200 generates the zone session manager 210 to correspond to the zone.

The zone management server 200 may match the zone session manager 210 generated to correspond to the zone and the position tracking sensor 230 in the zone with each other.

When the object enters corresponding zone, the zone session manager 210 allocates a unique zone session to correspond to the object which enters the corresponding zone. In this case, the zone session manager 210 may provide the space management server 100 with information on the zone session allocated to the object positioned in the zone.

The position tracking sensor 230 is installed to correspond to one zone, and tracks the position of the object positioned in the corresponding zone in real time and provides a position tracking result to the zone session manager 210.

The zone session manager 210 converts positional information sensed by the position tracking sensor 230 in the corresponding zone into a zone coordinate of the corresponding zone and matches the converted coordinate and the zone session allocated to the corresponding object with each other.

In this case, the zone session manager 210 may provide the space management server 100 with the zone coordinate which matches the zone session information. Herein, the zone session manager 210 monitors the positional information of the corresponding object in real time or at a predetermined time interval, and provides the monitored positional information to the space management server 100.

Meanwhile, when the object positioned in the corresponding zone deviates from the zone, the zone session manager 210 cancels the zone session allocated to the corresponding object and provides zone session cancellation information for the corresponding object to the space management server 100.

Accordingly, the space management server 100 may manage the position of the object in the corresponding space based on the information provided from the zone session manager 210, which corresponds to each zone.

The space management server 100 may include a zone manager 110, a space session manager 130, and a position manager 150 as illustrated in FIG. 2.

The zone manager 110 separates a predetermined space into a predetermined number of spaces to distinguish the predetermined space into a plurality of zones and registers the information of each zone. In this case, the zone manager 110 may divide the predetermined space into zones of the number corresponding to the number of the position tracking sensors 230 installed in the corresponding space.

Figure 4:
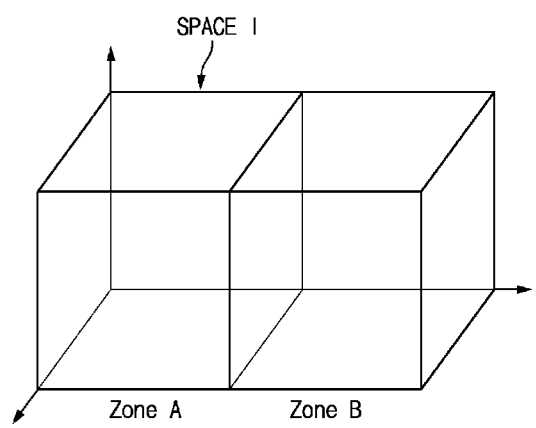
FIGS. 4 to 8 are diagrams illustrating an exemplary embodiment referred for describing an operation of the system for tracking a position according to the present invention.

As one example, as illustrated in FIG. 4, the zone manager 110 may separate a predetermined space Space I into two zones ZONE 1 and ZONE 2 to correspond to the respective position tracking sensors 230 and manage information on the position tracking sensor 230 and the zone session manager 210 corresponding to ZONE 1 and ZONE 2, respectively.

The zone manager 110 may provide to the zone management server 200 with information on the zone separated with respect to the corresponding space. Further, the zone manager 110 may receive the information on the zone session manager 210 generated to correspond to the zone in the zone management server 200 from the zone management server 200 and register and manage the information.

When the space session manager 130 receives the zone session information from the zone management server 200 to correspond to the object which enters each zone in the corresponding space, the space session manager 130 transfers the zone session information of the corresponding object to the position manager 150 for registering the corresponding object.

The space session manager 130 may receive the positional information of the zone session corresponding to the object from the zone management server 200 and receive updated positional information of a preregistered zone session. In this case, the space session manager 130 transfers the positional information corresponding to the zone session of the object or the updated positional information to the position manager 150.

As illustrated in FIG. 4, the position manager 150 registers information on an object which enters for each of zones ZONE A and ZONE B separated with respect to the corresponding space SPACE I and tracks the position of the corresponding object for each time slot by connecting the zone session and the space session of the corresponding object.

First, when the zone session information of the object is transferred from the space session manager 130, the position manager 150 adds the corresponding session information to an object list. Herein, the object list is information on the object which is present in the corresponding space. Therefore, when the positional information is transferred from the space session manager 130 with respect to the zone session registered in the object list, the position manager 150 tracks the position of the object in the space based on the transferred positional information, that is, the zone coordinate information.

When the zone session is added to the object list, the position manager 150 may allocate the space session to the added zone session. Further, when the zone session registered in the object list at the previous time is cancelled at the corresponding time, the position manager 150 cancels the space session corresponding to the zone session and removes the space session from the object list.

The position manager 150 may receive the information of the zone session added or cancelled with a predetermined time period and the positional information of the registered zone session.

Figure 5:
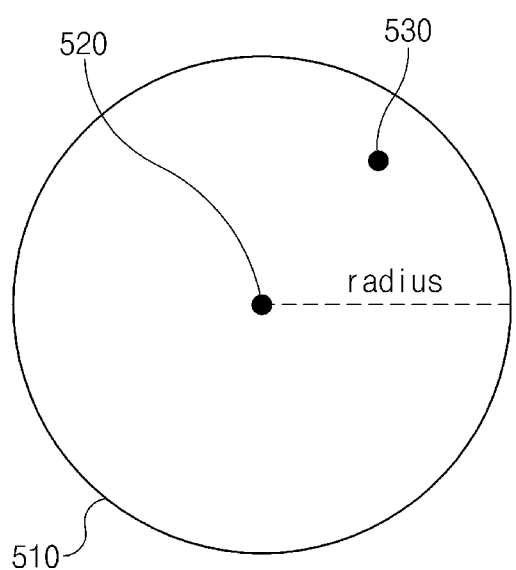

Herein, as illustrated in FIG. 5, the position manager 150 predicts a position at a corresponding time slot based on a movement path of the corresponding object in a category 510 allocated based on a position 520 of the object verified in a space at the previous time slots and updates the position of the object based on a predicted new position 530.

In this case, the position manager 150 allocates only one space session to the object positioned in the space and connects the space session and the zone session. Herein, the position manager 150 updates the connection of the space session and the zone session every time slot.

As one example, when it is assumed that an object list present in the space at a k−1-th time slot is Uk−1={u1, u2, u3}, an object list present in the space at a k-th time slot is Uk={u1, u2, . . . , un}, and a space session verified at the k-th time slot is Ok={o1, o2, . . . , om}, the position manager 150 connects the objects, which belong to Uk−1, and the space sessions, which belong to Ok, to each other to allow the objects, which belong to Uk, to maintain the previous space session or newly allocate a space session to objects which newly enters the space.

Therefore, an operation of updating the connection of the space session and the zone session for each time slot will be described in detail with reference to the exemplary embodiment of FIG. 6.

Figure 6:
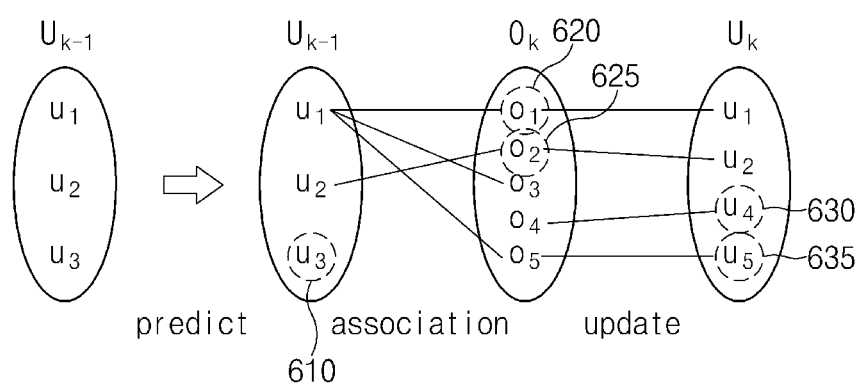

Referring to FIG. 6, when Uk−1={u1, u2, u3}, Uk={u1, u2, u4, u5}, and Ok={o1, o2, o3, o4, o5}, the position manager 150 connects the objects u1 and u2, which belong to Uk−1, and the space sessions o1 620 and o2 625, which belong to Ok, to each other maintain the space sessions of u1 and u2, which belong to Uk.

Meanwhile, as the object u3 610, which belongs to Uk−1, leaves the corresponding space, u3 610 does not belong to Uk, and as a result, the position manager 150 cancels the space session allocated to u3.

Since u4 630 and u5 635 are added to Uk, the position manager 150 allocates new space sessions o4 and o5 to u4 and u5, respectively.

Herein, an operation of connecting and updating the session by the position manager 150 will be described in more detail through exemplary embodiments of FIGS. 7 and 8.

Figure 7:
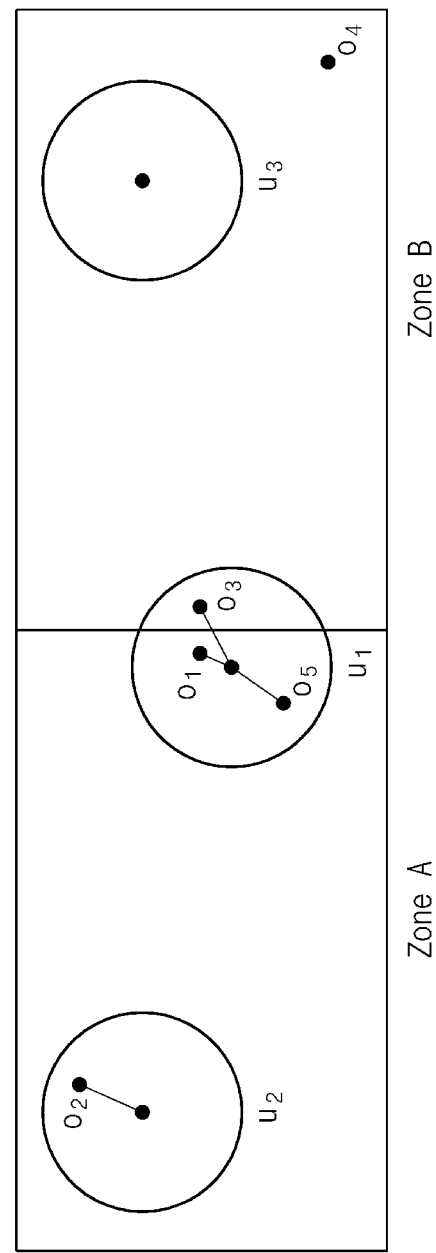

First, FIG. 7 illustrates space session candidates searched in respective zones ZONE A and ZONE B based on a previous position of a zone session registered in an object list.

Referring to FIG. 7, three space session candidates o1, o3, and o5 are searched in an allocation range of object 1 u1 positioned in ZONE A and one space session candidate o2 is searched in the allocation range of object 2 u2. Meanwhile, the space session candidate is not searched in the allocation range of object 3 u3 positioned in ZONE B and a space session candidate o4 is searched in the other ranges.

Figure 8:
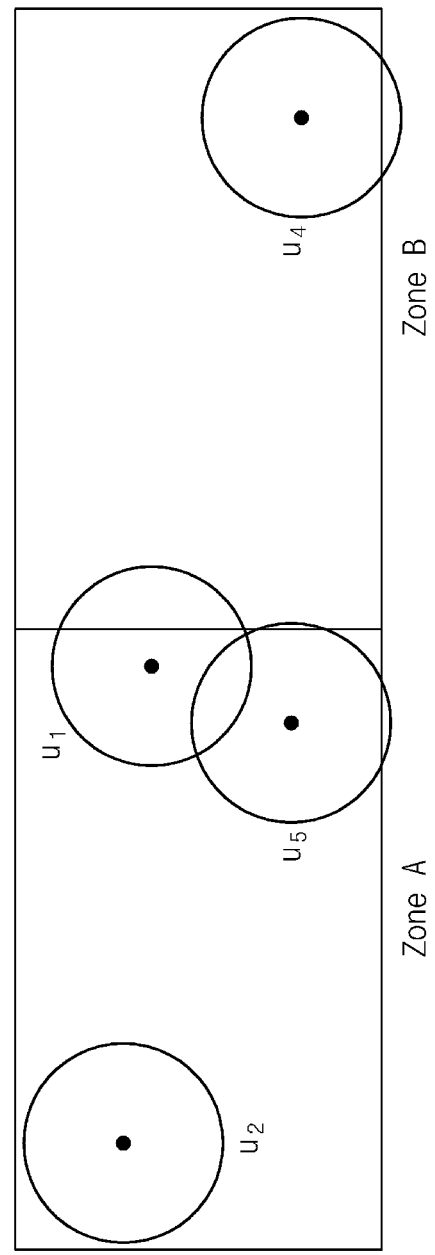

FIG. 8 illustrates a position of an updated object based on positions of the space session candidates searched in FIG. 7.

In this case, as illustrated in FIG. 8, the position manager 150 recognizes as the corresponding object a space session positioned at a closest distance to the previous position of the object among the space session candidates searched in the allocation range to connect the session.

Referring to FIG. 8, the position manager 150 connects the space session o1 positioned at the closest distance to object 1 u1 to the space session of object 1 u1 in the allocation range of object 1 u1. Further, the position manager 150 connects the space session o2 positioned at the closest distance to object 2 u2 to the space session of object 2 u2 in the allocation range of object 2 u2.

Meanwhile, since there is no space session searched in the allocation range of object 3 u3, the position manager 150 may recognize that object 3 u3 leaves the corresponding space.

When a zone session corresponding to the space session o4 searched in the corresponding space is not registered, the position manager 150 adds a new zone session u4 to the object list. Similarly, since the space session o5 searched in the allocation range of object 1 u1 does not correspond to object 1 u1, the position manager 150 recognizes the space session o5 as a new zone session u5 to add the recognized zone session u5 to the object list.

Meanwhile, since the space session o3 searched in the allocation range of object 1 u1, which is the space session searched in ZONE B, corresponds to a zone different from ZONE A where object 1 u1 is positioned, the space session o3 is assumed to be duplicatively sensed and is disregarded.

An operational flow of the system for tracking a position according to the present invention, which is configured as above, will be described below in more detail.

Figure 9:
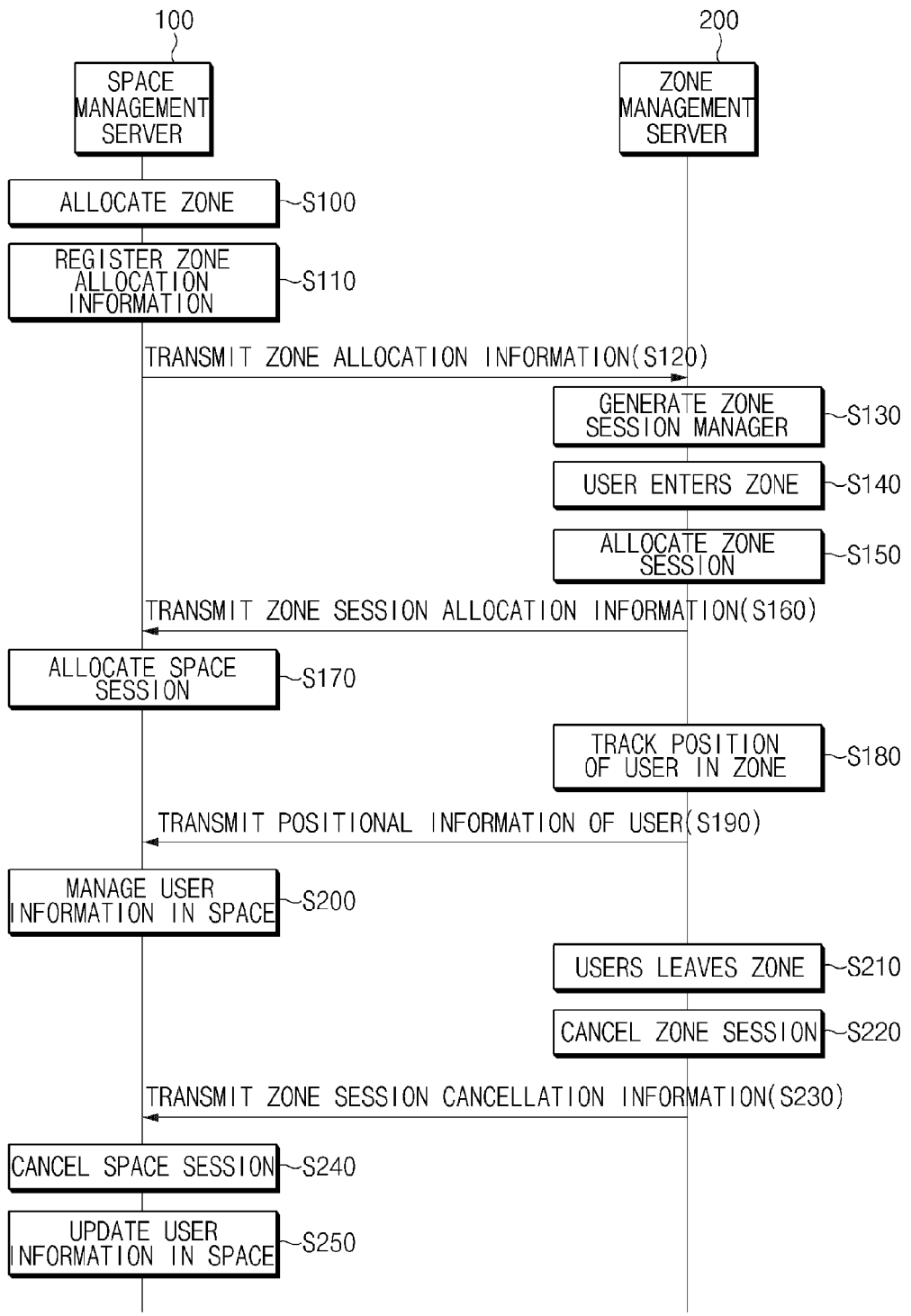
FIG. 9 is a diagram illustrating an operational flow for a method for tracking a position according to the present invention.

FIG. 9 is a diagram illustrating an operational flow for a method for tracking a position according to the present invention.

Referring to FIG. 9, the space management server 100 divides a predetermined space into a plurality of spaces to allocate a zone (S100) and registers and manages zone allocation information (S110).

The space management server 100 transfers the zone allocation information to the zone management server 200, (S120) and in this case, the zone management server 200 generates the zone session manager 210 corresponding to corresponding zone based on the zone allocation information transferred from the space management server 100 (S130).

When a user enters the corresponding zone as one object (S140), the zone session manager 210 allocates the zone session to the user who enters the corresponding zone (S150) and provides zone session allocation information for the user to the space management server 100 (S160).

In this case, the space management server 100 allocates the space session corresponding to the zone session information allocated to the user (S170). Herein, the space management server 100 may add user information to the object list based on the corresponding zone session information.

Thereafter, the zone management server 200 tracks the position of the user, to which the zone session is allocated, through the position tracking sensor 230 in the corresponding zone (S180) and transmits the positional information of the user to the space management server 100 every predetermined time (S190).

Therefore, the space management server 100 manages the position of the user in the corresponding space based on the positional information of the user transmitted from the zone management server 200 (S200). Herein, the space management server 100 updates the position of the user in the corresponding space by connecting the zone session and the space session every time slot.

Meanwhile, when the user leaves the corresponding zone and the corresponding space (S210), the zone management server 200 cancels the zone session allocated to the user (S220) and transmits the zone session cancellation information for the user to the space management server 100 (S230).

Therefore, the space management server 100 cancels the space session connected to the zone session according to the zone session cancellation information for the corresponding user (S240) and updates the user information registered in the corresponding space (S250).

The space management server and the zone management server 200 of the system for tracking a position according to the exemplary embodiment, which operate as described above, may be implemented as an independent hardware device. Meanwhile, the space management server and the zone management server 200 of the system for tracking a position according to the exemplary embodiment may be driven as one or more processors while being included in another hardware device such as a microprocessor or a universal computer system.

Figure 10:
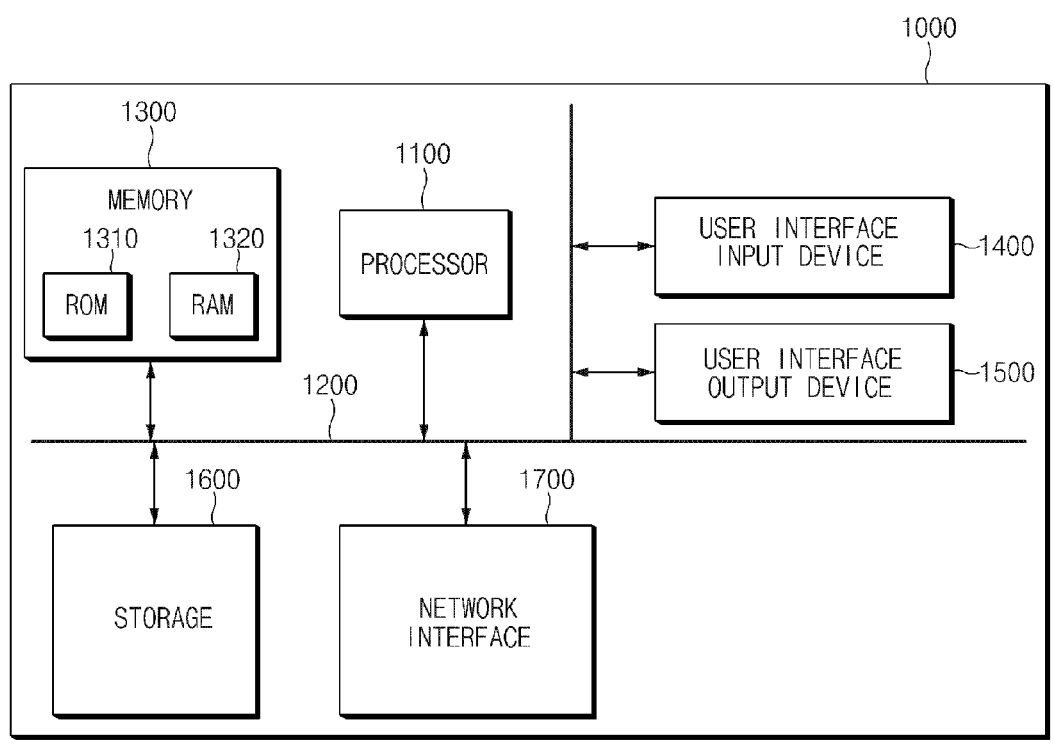
FIG. 10 is a diagram illustrating a configuration of a computing system to which a server is applied according to the present invention.

FIG. 10 is a diagram illustrating a computing system to which each server is applied according to the present invention.

Referring to FIG. 10, a computing system 1000 may include at least one processor 1100, a memory 1300, an object interface input device 1400, an object interface output device 1500, a storage 1600, and a network interface 1700, which are connected through a bus 1200.

The processor 1100 may be a semiconductor device that executes processing of commands stored in a central processing unit (CPU) or the memory 1300 and/or the storage 1600. The memory 1300 and the storage 1600 may include various types of volatile or non-volatile storage media. For example, the memory 1300 may include a read only memory (ROM) and a random access memory (RAM).

Therefore, steps of a method or an algorithm described in association with the exemplary embodiments disclosed in the specification may be directly implemented by hardware and software modules executed by the processor 1100, or a combination thereof. The software module may reside in storage media (that is, the memory 1300 and/or the storage 1600) such as a RAM, a flash memory, a ROM, an EPROM, an EEPROM, a register, a hard disk, a removable disk, and a CD-ROM. The exemplary storage medium is coupled to the processor 1100 and the processor 1100 may read information from the storage medium and write the information in the storage medium. As another method, the storage medium may be integrated with the processor 1100. The processor and the storage medium may reside in an application specific integrated circuit (ASIC). The ASIC may reside in an object terminal. As yet another method, the processor and the storage medium may reside in the object terminal as individual components.

The above description just illustrates the technical spirit of the present invention and various changes and modifications can be made by those skilled in the art to which the present invention pertains without departing from an essential characteristic of the present invention.

Therefore, the exemplary embodiments disclosed in the present invention are used to not limit but describe the technical spirit of the present invention and the scope of the technical spirit of the present invention is not limited by the exemplary embodiments. The scope of the present invention should be interpreted by the appended claims and it should be analyzed that all technical spirit in the equivalent range thereto are intended to be embraced by the scope of the present invention.

What is claimed is:

1. A system for tracking a position based on multiple sensors, the system comprising:
   a space management server which divides a predetermined space into a predetermined number of spaces to generate a plurality of zones and manage information of each of the plurality of zones, and a zone management server which manages the information of a respective zone amongst the plurality of zones generated by the space management server and provides the space management server with zone session information of a corresponding object positioned within the respective zone and positional information of the corresponding object sensed by a position tracking sensor during every time slot, wherein the space management server adds the corresponding object to an object list based on the zone session information of the object provided from the zone management server and connects a corresponding space session to a corresponding zone session for objects included in the object list to track the position of the corresponding object through the corresponding space session.

2. The system of claim 1, wherein the zone management server generates a zone session manager managing the zone, and the corresponding zone session manager allocates the zone session to an object, which enters the zone, and cancels the zone session allocated to an object which leaves the zone.

3. The system of claim 1, wherein the space management server detects a position of the corresponding space session during every time slot and connects the corresponding space session detected in an allocated category based on the position of an object verified in the corresponding space at a previous time slot.

4. The system of claim 3, wherein the space management server connects the space session positioned at a closest distance when the number of space sessions detected in the allocated category based the position of the object verified in the corresponding space at the previous time slot is two or more.

5. The system of claim 3, wherein when the space session detected in the allocated category based on the position of the object verified in the corresponding space at the previous time slot is detected in a zone different from the zone where the corresponding object is positioned, the space management server determines that the space session is duplicatively detected.

6. The system of claim 3, wherein when there is no space session detected in the allocated category based on the position of the object verified in the corresponding space at the previous time slot, the space management server cancels the space session by determining that the corresponding object leaves the space.

7. The system of claim 3, wherein when the space session is detected in a category other than the allocated category based on the position of the object verified in the corresponding space at the previous time slot, the space management server connects the corresponding space session to the zone session newly added to the object list.

8. The system of claim 1, wherein the space management server divides the predetermined space into a number of zones corresponding to a number of position tracking sensors positioned in the corresponding space.

9. The system of claim 1, wherein the plurality of zones are regions which are constituted by a field of view (FoV) and an operating region (range) of each position tracking sensor and do not overlap with each other.

10. A method for tracking a position based on multiple sensors, the method comprising:

dividing, by a space management server, a predetermined space into a predetermined number of spaces according to a number of position tracking sensors installed in the predetermined space to generate a plurality of zones;

generating, by a zone management server, a zone session manager corresponding to a respective zone amongst the plurality of zones generated by the space management server and providing the space management server with zone session information of a corresponding object positioned within the respective zone allocated by the zone session manager and positional information of the corresponding object sensed by a position tracking sensor;

updating, by the space management server, an object list based on the zone session information of the corresponding object provided from the zone session manager; and tracking the position of the corresponding object through a corresponding space session by connecting the corresponding space session to a corresponding zone session for objects included in the object list.

11. The method of claim 10, wherein the tracking of the position of the object includes detecting the position of the space session during every time slot and connecting the space session detected in an allocated category based on the position of an object verified in the corresponding space at a previous time slot.

12. The method of claim 10, wherein in the tracking of the position of the object, the space session positioned at a closest distance is connected when the number of space sessions detected in the allocated category based the position of the object verified in the corresponding space at the previous time slot is two or more.

13. The method of claim 10, wherein in the tracking of the position of the object, when the space session detected in the allocated category is detected in a zone different from the zone where the corresponding object is positioned based on the position of the object verified in the corresponding space, it is determined that the space session is duplicatively detected.

14. The method of claim 10, wherein in the tracking of the position of the object, when there is no space session detected in the allocated category based on the position of the object verified in the corresponding space at the previous time slot, the space session is cancelled by determining that the corresponding object leaves the space.

15. The method of claim 10, wherein in the tracking of the position of the object, when the space session is detected in a category other than the allocated category based on the position of the object verified in the corresponding space at the previous time slot, the corresponding space session is connected to the zone session newly added to the object list.

* * * * *